July 7, 1936.  E. KNOLLER  2,047,074

MOUNTING OF AIRCRAFT GUNS

Filed May 7, 1935

E. Knoller
INVENTOR

By Glascock Downing Seebold
Attys.

Patented July 7, 1936

2,047,074

UNITED STATES PATENT OFFICE 2,047,074

MOUNTING OF AIRCRAFT GUNS

Erich Knoller, Vienna, Austria

Application May 7, 1935, Serial No. 20,268
In Germany May 8, 1934

4 Claims. (Cl. 89—37)

The question of recoil is of considerable importance in the case of guns mounted on aircraft, and therefore it has been proposed already to secure the gun to the motor of the flying machine in order to satisfy this demand.

However according to the present invention this known construction can be improved considerably and adapted for the absorption of considerably larger recoil-energies by rendering movable not only the gun-barrel with respect to the motor of the aircraft but by allowing the motor to carry out a certain backward movement with respect to the aircraft. Even the case may arise wherein the backward movement of the barrel is rendered unnecessary in view of the said backward movement of the motor. Particularly in the case of barrels of light weight, the backward movement jointly carried out by the barrel and the motor results in a considerable reduction of the length of the backward movement and in a more smooth transmission of the recoil to the aircraft.

In view of its construction, the motor can be subjected to a considerably higher acceleration than the structure of the aircraft, which in most cases is loaded to the limit of its strength. The structure of the aircraft and for psychologic reasons also the airmen have to be safeguarded against heavy and hard shocks caused as a consequence of firing the gun. However if also the motor or another part of the aircraft carry out the backward movement, the primary movement of the recoiling barrel distributes itself over a larger mass, so that the speed of the recoil and the length of the backward movement can be reduced considerably.

In this case, the motor performing its backward movement is held in position with respect to the aircraft by brakes and advancing devices in the manner commonly used in connection with guns, said advancing devices constituting mainly a safeguard, because the motor is pulled back into its initial position already by the tractive effort of the air propeller. Stops and shock absorbers are provided for preventing sudden shocks.

Figure 1:
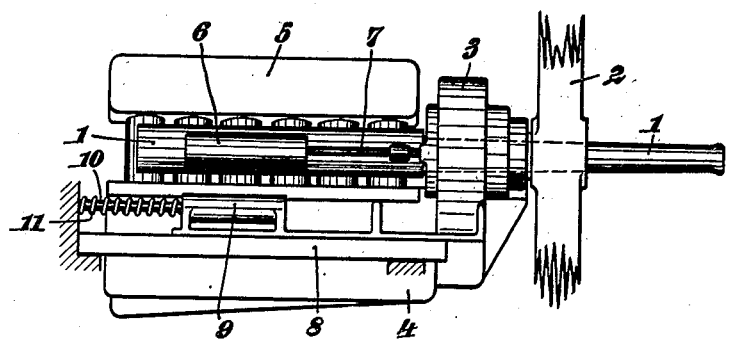
Figure 2:
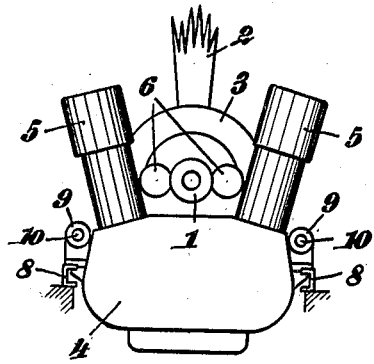

One mode of carrying out the present invention is illustrated by way of example on the accompanying sheet of drawings in Fig. 1 in side view and in Fig. 2 in back view.

The barrel 1 of the gun passes through and out of the hollow shaft of the air propeller 2 which, in known manner, is driven by way of a gear 3 by the two crank shafts of the motor 4, provided with two rows of cylinders 5. In Fig. 1 one row of cylinders has been omitted, in order to show the gun-barrel 1 and one of its brake-cylinders 6, which are secured to the gun-barrel. The piston rods 7 of the brake-cylinders are secured to the casing of the gear 3.

The motor is not screwed to the aircraft but is adapted to slide forward and backward on supports 8. In order to control this movement, brake-cylinders 9 are secured to both sides of the motor, the piston rods 10 of said brake-cylinders being secured to the aircraft, while compression springs 11 mounted on said piston rods ensure the return movement of the latter into the initial position.

When firing the gun, at first the barrel alone moves backward and in view of the action of its brakes 6 and 7 subsequently takes with it the motor, sliding on the supports 8, until the backward movement is stopped by the brakes 9, 10 and 11. Hereafter the motor is returned into its initial position by the springs 11 and by the tractive effort of the air propeller 2.

What I claim is:—

1. Means for mounting an aircraft-motor to which a gun-barrel is secured, comprising in combination a slide supporting said motor and on which the motor slides backward and forward with respect to the body of the aircraft, and a shock-absorber interposed between the motor and the body of the aircraft for absorbing the recoil when firing the gun.

2. Means for mounting an aircraft-motor to which a gun-barrel is secured, comprising in combination a slide supporting said motor and on which the motor slides backward and forward with respect to the body of the aircraft, a brake-cylinder secured to the motor, a piston working in said cylinder, a rod connecting said piston with a part of the aircraft, and a compression spring on said rod and promoting the forward movement of the motor.

3. Means for connecting a gun with the motor of an aircraft and for mounting said motor on the aircraft, comprising in combination a gun-barrel mounted for movement backward and forward with respect to the motor, a shock-absorber interposed between said motor and said gun-barrel, a slide supporting said motor and on which the motor moves backward and forward with respect to the body of the aircraft, and shock-absorber interposed between the motor and the body of the aircraft.

4. Means for connecting a gun with the motor of an aircraft and for mounting said motor on the aircraft, comprising in combination a gun-barrel mounted for movement backward and forward with respect to the motor, a brake-cylinder secured to the gun-barrel, a piston working in said cylinder, means connecting said piston with the motor, a slide supporting said motor and on which the motor slides backward and forward with respect to the body of the aircraft, a brake interposed between the motor and the body of the aircraft, and a spring connected with the motor for promoting the forward movement of the motor.

ERICH KNOLLER.